Jan. 7, 1964  LE ROY OVERSTREET, JR  3,116,795
GRASS SPRIG AND ROOT HARVESTING DEVICE
Filed March 5, 1962  4 Sheets-Sheet 2

LEROY OVERSTREET, JR.
INVENTOR.

BY
Wayland D. Keith
HIS AGENT

Jan. 7, 1964 LE ROY OVERSTREET, JR 3,116,795
GRASS SPRIG AND ROOT HARVESTING DEVICE
Filed March 5, 1962 4 Sheets-Sheet 3

*LEROY OVERSTREET, JR.*
INVENTOR.

BY
*Wayland D. Keith*
*HIS AGENT*

Jan. 7, 1964   LE ROY OVERSTREET, JR   3,116,795
GRASS SPRIG AND ROOT HARVESTING DEVICE
Filed March 5, 1962   4 Sheets-Sheet 4
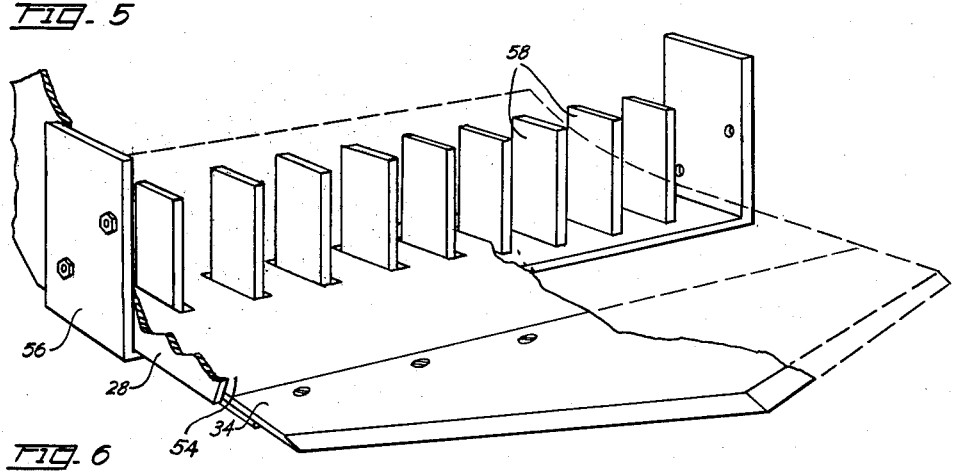
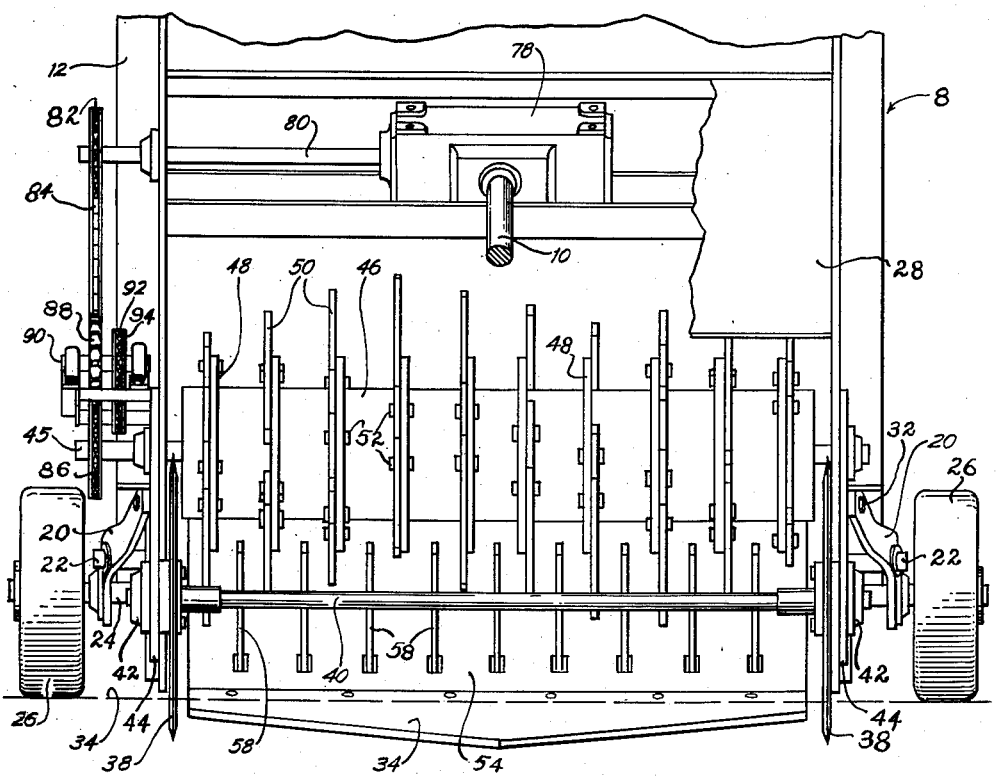
LEROY OVERSTREET, JR.
INVENTOR.
BY
*Wayland D. Keith*
HIS AGENT

United States Patent Office 3,116,795
Patented Jan. 7, 1964

3,116,795
GRASS SPRIG AND ROOT HARVESTING DEVICE
Le Roy Overstreet, Jr., Electra, Tex.
(Rte. 1, Box 251A, Wichita Falls, Tex.)
Filed Mar. 5, 1962, Ser. No. 177,537
4 Claims. (Cl. 171—116)

This invention relates to improvements in harvesters for harvesting grass sprigs, and/or roots, and the like of various grasses which start and spread from sod, such as Bermuda grass, Coastal Bermuda, and the like.

Various sod and sprig harvesters have been proposed heretofore, but these for the most part utilized considerable mechanism which was subject to wear by the abrasive action of the dirt removed from the sprigs, which made the repairs and upkeep of these devices so expensive as to make the operation thereof unprofitable.

The present device is constructed with a minimum of parts for the function to be performed, which device is readily adjustable to various depths to remove the desired amount of roots, yet it is sufficiently light in weight to be readily hoisted by the hydraulic drawbar lift to enable the tractor and sprig harvester to be maneuvered into close places.

The present sprig harvester is shown to be driven from a power take-off of the tractor in such manner as to enable the threshing mechanism to thoroughly cleanse the soil from the grass sprigs and/or roots before the sprigs and/or roots are delivered into a trailer which is towed behind the sprig harvester.

An object of this invention is to provide a harvester for harvesting grass sprigs and/or roots which will uproot the grass, shred it into sprigs and roots, or into chunks of usable size, and deliver the shredded grass sprigs and/or roots onto a conveyer, which is so designed as to sift out the surplus soil from the sod before it is discharged into a trailer.

Another object of the invention is to provide a harvester for harvesting grass sprigs and/or roots whereby a single drive is utilized to drive both the threshing mechanism and the conveying and cleaning apparatus.

Still a further object of the invention is to provide a harvester for harvesting grass sprigs which harvester may be readily lifted out of the ground by the power lift of the tractor for movement from place to place.

Still another object of the invention is to provide a device for harvesting grass sprigs and/or roots which will readily cut from turf, grass sprigs to the desired depth in ribbon-like strips, and whereby the ribbon of sod is immediately shredded into usable tufts or sprigs of grass with roots thereon, which is freed of dirt to enable the tufts of sod and/or roots to either be planted by hand or to be planted by a planter.

And a final object of the invention is to provide a harvester for harvesting grass sprigs and/or roots which is simple in construction, easy to adjust, low in the cost of manufacture, sturdy in construction, and which requires a minimum of repair.

With these objects in mind and others which will become manifest as the description proceeds, reference is to be had to the accompanying drawings in which like reference characters designate like parts in the several views thereof, in which:

FIG. 5 is a fragmentary perspective view of a thresher bar mounted adjacent the rotating cylinder to aid in removing the dirt from the sod plowed up;

FIG. 6 is a front elevational view of the harvester for harvesting grass sprigs and/or roots; and FIG. 7 is a fragmentary, elevational view of a portion of the upper reach of the conveyor chain, showing an eccentric idler sprocket mounted thereunder to give a vibratory movement to the chain for removing soil from the grass sprigs and/or roots.

Figure 1:
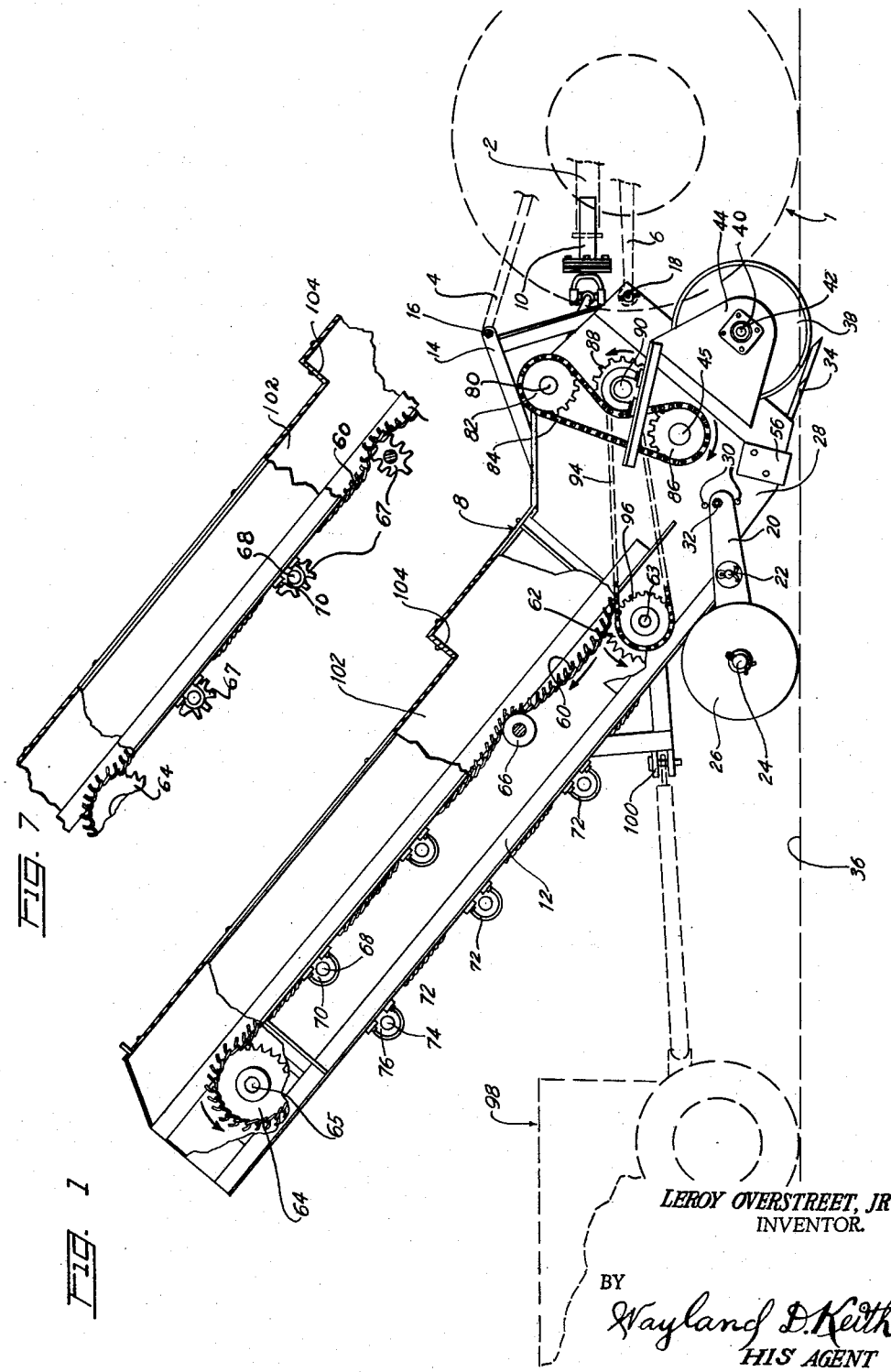
FIG. 1 is a fragmentary side elevational view of the harvester for harvesting grass sprigs and/or roots, with parts broken away and shown in section to bring out the details of construction, and showing, in dashed outline, a tractor having a power lift and a power take-off thereon.

With more detailed reference to the drawings, the numeral 1 designates generally a tractor element, such as a tractor having a power take-off drive 2 and power lift arms 4 and 6. The sprig harvester is generally designated by the numeral 8 and has a drive shaft 10 extending forwardly thereof to complementally engage with the power take-off drive 2 of tractor 1.

The grass sprig harvester 8 preferably has a structural frame 12, which has a pair of forwardly extending apertured lugs 14 thereon which lugs are adapted to be coupled with power lift arms 4 by pins 16. A pair of pins 18 connect the forward end of frame 12 with power lift arms 6 on tractor 1. With the power lift arms 4 and 6 thus connected to the grass sprig harvester 8, the sprig harvester 8 may be readily raised and lowered by power lift arms 4 and 6 in a manner well known in the art of tractor power lifts. A pair of arms 20, one on each side of frame 12, is pivotally mounted on frame 12 by pivot members 22. The rear end of each arm 20 is apertured, which apertures receive an axle 24 therethrough, on which axle 24 wheels 26 are journaled, one on each side of frame 12.

The forward end of frame 12 has a closed housing 28, which housing has holes 30 therein to receive bolts 32 therethrough and through the respective forward end of apertured arms 20. By moving the arms 20 so that the bolts 32 may be inserted into selected holes of the various holes 30, the angularity of plow 43, with respect to the terrain 36, can be varied. The plow 34 is of a size to cut the sod to the desired width. A pair of disc members 38, one on each side of plow 34, is mounted on a shaft 40, which shaft is journaled in bearing 42 which are mounted on lugs 44; the lugs 44 are secured to the forward portion of housing 28 and are so positioned that the disc members 38 will cut into the earth substantially to the same depth as plow 34. The plow 34 comprises a transverse blade which may be adjusted to be relatively flat so the blade will slide into the soil below the roots of the grass being uprooted, which cut soil, grass sprigs and/or roots will move upward therealong. A drum 46 is mounted in housing 28 so as to be rearward and slightly above plow 34, and has annular apertured rings 48 secured thereto at spaced intervals longitudinally thereof to form mounting rings for fingers 50. As the drum rotates, the fingers 50 thereon move the sprigs and/or roots upward. The fingers 50 are secured to the respective annular apertured rings by bolts 52. In the present instance three fingers or shredding elements 50 are positioned on each ring 48 and the fingers on adjacent annular rings are so spaced that, when the respective series of fingers are taken as a group, they will create separate spiral rows, so only one finger at a time will engage the sod, which lightens the power load required to shred the sod. The fingers will move the sod containing the grass sprigs and roots rearward onto a concave element 54 which has transverse bar 56 mounted in parallel relation to the axle 45, on which drum 46 is mounted. The bar 56 has spaced apart teeth thereon, which teeth extend upward between the paths defined by the respective teeth 50, upon rotation of the teeth. As grass is being moved from plow blade 34 rearward, the teeth 50 will pass the sprigs and sod by and between upstanding teeth 58 on bar 56, then upward along concave member 54. Due to the speed at which the drum 46 is rotating, the grass sprigs and/or roots, and dirt will be moved rearward and upward at such an angle that the spigs and/or roots, and a portion of the dirt will come to rest in the sagged portion of conveyer chain 60, which chain is composed of spaced apart, longitudinal bars which are secured together in such manner as to pass around sprockets 62 and 64 mounted on the respective shafts 63 and 65 which shafts are journaled on frame 12. The conveyer chain is supported by rollers 66 on the upper portion of frame 12 to support the upper reach of the conveyer chain 60, which rollers are mounted on shafts 68 journaled in bearings 70 mounted on the upper portion of frame 12. Similar rollers 72 are mounted on shafts 74, which shafts are journaled in bearings 76, which bearings are mounted on the lower portion of frame 12 to support the lower reach of conveyer chain 60.

Figure 2:
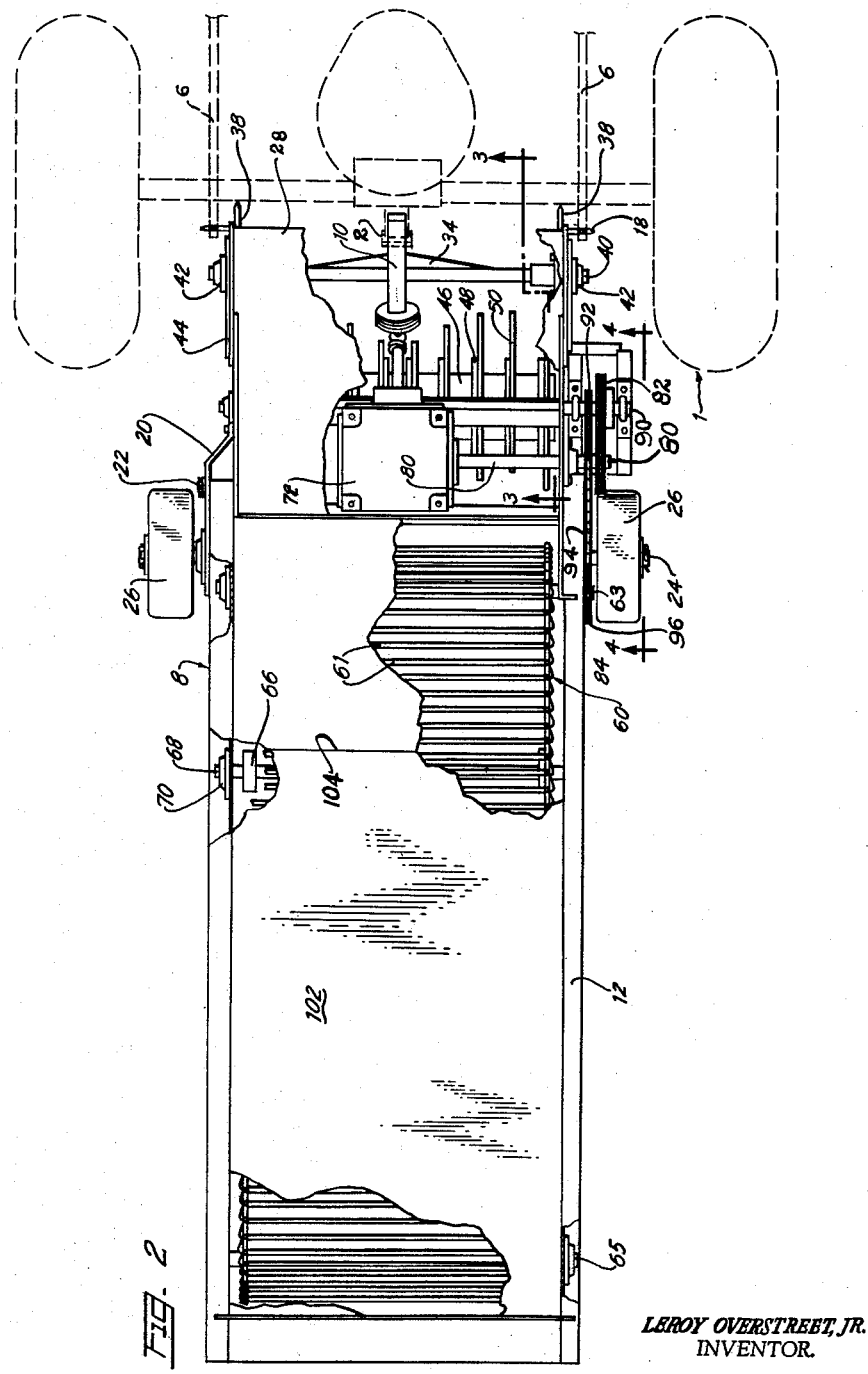
FIG. 2 is a top plan view of the harvester for harvesting grass sprigs and/or roots with parts broken away and shown in section to bring out the details of construction, and showing a portion of the tractor in dashed outline.
Figure 3:
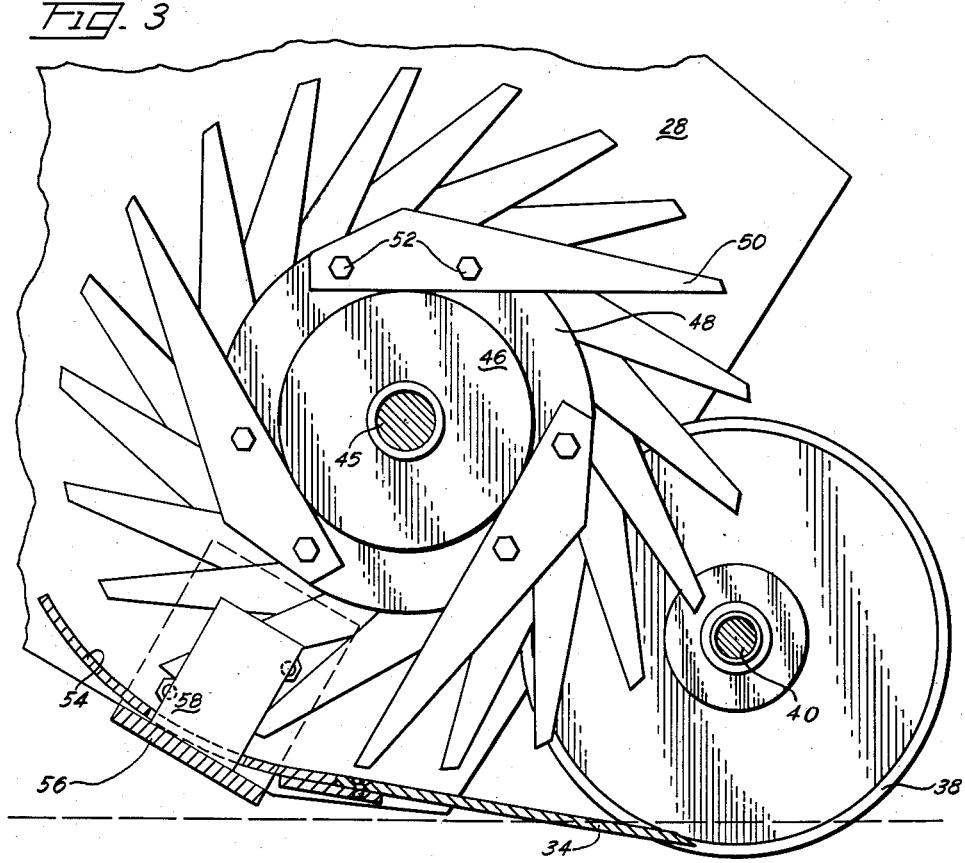
FIG. 3 is an enlarged, fragmentary, sectional view taken on line 3—3 of FIG. 2, looking in the direction indicated by the arrows.
Figure 4:
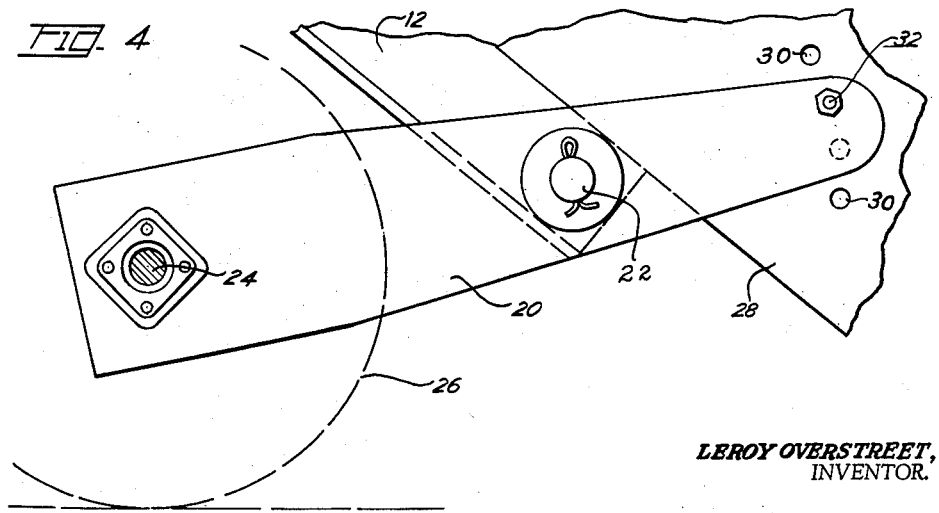
FIG. 4 is a fragmentary, sectional view taken on line 4—4 of FIG. 2, looking in the direction indicated by the arrows.

Shaft 63 and shaft 65 mount the respective pairs of sprockets 62 and 64 on the respective shafts in spaced apart relation between the outer members of frame 12, as will best be seen in FIG. 2.

A gear housing 78 is mounted on the upper surface of housing 28 with the shaft 10 extending thereinto. A driven shaft 80 extends outward from gear housing 78, which gear housing has gear members mounted therein. The shaft 80 has a sprocket 82 secured on the outer end thereof around which is positioned a transmission drive chain 84. Transmission drive chain 84 also encircles sprocket 86 mounted on the outer end of drum shaft 45. A third sprocket 88 is in engagement with the outer side of one of the reaches of chain 84. The sprocket 88 is rotated in the opposite direction from sprockets 82 and 86, which sprocket 88 is mounted on shaft 90, which has a sprocket 92 secured thereon. A transmission drive chain 94 encircles sprockets 92 and 96, the sprocket 96 being mounted on and secured to shaft 63, so as to drive sprocket 62 in the direction indicated by the arrow, which will cause the lower reach of the conveyer chain 60 to be tightened, which will leave a sag or concave portion in the upper reach of the conveyer chain 60 intermediate sprocket 62 and the first support roller 66. It is at this point that the grass sprigs, roots, and dirt will be thrown by the rotating action of drum 46 and teeth 50, and with the sprocket 62 rotating in the direction indicated by the arrow in FIG. 1, the conveyer chain 60 will move upward carrying the grass sprigs and roots therealong, with the dirt being sifted out between the bars 61 of the conveyer chain 60. At the same time the grass sprigs and roots will be be elevated to the upper end of the conveyer chain 60 and will be discharged from the upper end thereof and into a trailer 98, as shown in dashed outline in FIG. 1, which trailer is connected to a trailer hitch 100 on the lower side of frame 12 of the harvester.

Upon the grass sprigs and roots being delivered into the trailer 98, these may be periodically wet with water, either manually or automatically, to maintain the roots and sprigs in live condition until they are used for planting.

It is preferable to have a housing 102 positioned above the upper reach of conveyer chain 60 and that the housing 102 have an offset portion 104 substantially above the sagged portion of conveyer chain 60 which is to receive the grass sprigs, roots, and dirt to direct them upwardly by shredder fingers 50. Should the speed of the fingers be such that the grass sprigs and roots are thrown against the top of the housing, the offset portion 104 thereof will arrest the movement of the sprigs and roots, which will cause these to fall substantially vertically back onto the conveyer chain 60, whereupon the upward movement of the chain, which is relatively slack, will cause a vibratory movement to sift the dirt and soil from the grass sprigs and roots so as to deliver substantially clean grass sprigs and roots from the upper end of the conveyer chain 60 and into the box of trailer 98 being towed behind the harvester 8.

A modified form of the invention is shown in FIG. 7 wherein non-concentric sprockets 67 are mounted on shafts 68 instead of idler rollers 66. As the non-concentric idler sprockets 67 engage conveyer chain 60, a vibratory movement is imparted to the conveyer chain 60 by non-concentric idlers 67 as the chain moves upward, which vibratory movement removes the soil from the grass sprigs and/or roots, which soil can not normally be removed by using concentric idlers 66. The idler rollers 66 and the non-concentric sprockets 67 are readily interchangeable to accomplish the desired result of removing the soil from the grass sprigs and/or roots.

Having thus clearly shown and described the invention what is claimed as new and desired to be secured by Letters Patent is:

1. A harvester for harvesting grass sprigs and/or roots which harvester comprises: a frame, an axle mounted on said frame transversely thereof, a pair of wheels mounted on said axle for rotation about the axis thereof, said frame adapted to have a traction element connected to the forward end thereof to move said frame over the terrain and to raise and lower said frame, a plow mounted on the forward end of said frame transversely thereof and extending downward for engagement in plowing relation with the terrain, a pair of vertically disposed cutter elements mounted on each side of said frame and positioned to extend into the terrain to approximately the same depth as said transversely disposed plow, a housing mounted on the forward end of said frame and forming a chamber, a shaft journaled transversely of said frame near the forward end thereof, a rotary drum mounted on said shaft with said drum being mounted within said housing, teeth secured to said drum in spirally arranged rows in uniform, uninterrupted patterns throughout the length of said drum, which teeth extend outwardly therefrom to a point near the upper face of said plow, a transverse plate extending rearwardly of said plow and being curved upwardly for a spaced distance rearwardly of the rear end of said plow, at least the upper portion of said frame having a housing thereover with the bottom portion rearward of said upwardly curved plate being open, a pair of shafts mounted on said frame transversely thereof rearwardly of said upwardly curved plate, one of said shafts being immediately rearward of said curved plate and the other of said shafts being near the rear end of said frame, a pair of spaced apart sprockets mounted on each said shaft and being within said frame, a conveyer chain mounted on said pairs of spaced apart sprockets, and drive means connecting the traction element in driving relation with said shaft mounting said toothed drum and with said conveyer chain.

2. A harvester for harvesting grass sprigs and/or roots as defined in claim 1, wherein said teeth on said toothed drum are spaced apart longitudinally so as to define a space therebetween when rotated, and wherein upstanding teeth are mounted on said transverse plate so said teeth will extend upward into said space defined by said rotating teeth.

3. A harvester for harvesting grass sprigs and/or roots, as defined in claim 1; wherein said teeth which are mounted on said drum, are positioned to have a rake angle with respect to a radial line touching the points of the respective teeth so the rake angle will be in the direction of rotation of said drum.

4. A harvester for harvesting grass sprigs and/or roots as defined in claim 1, wherein said teeth mounted on said drum are removably secured thereto by screw threaded bolts.

References Cited in the file of this patent
UNITED STATES PATENTS

| | | |
|---|---|---|
| 2,172,435 | Cook | Sept. 12, 1939 |
| 2,522,304 | Schuch | Sept. 12, 1950 |
| 2,753,780 | Brown | July 10, 1956 |